H. E. HENDRIX.
COPY HOLDER FOR TYPE WRITERS.
APPLICATION FILED FEB. 25, 1914.
1,227,436.
Patented May 22, 1917.
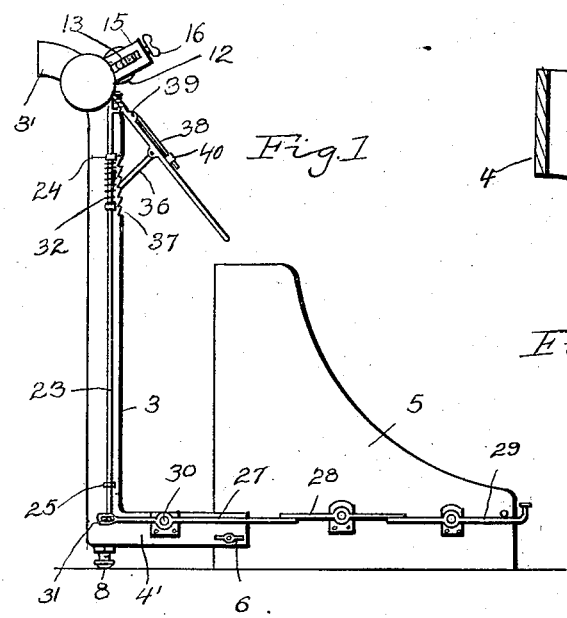
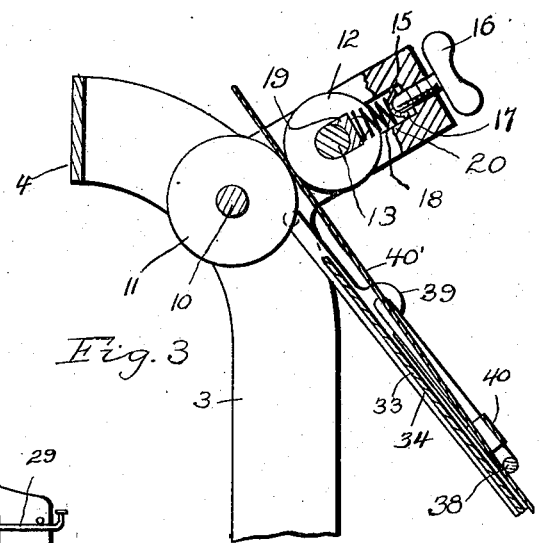
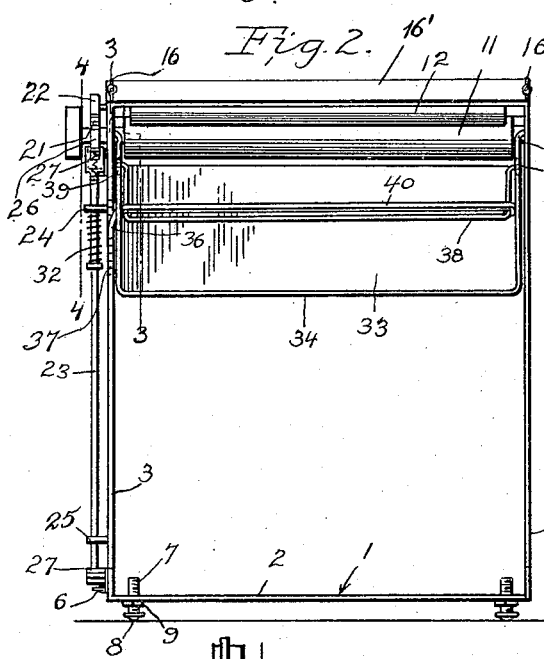
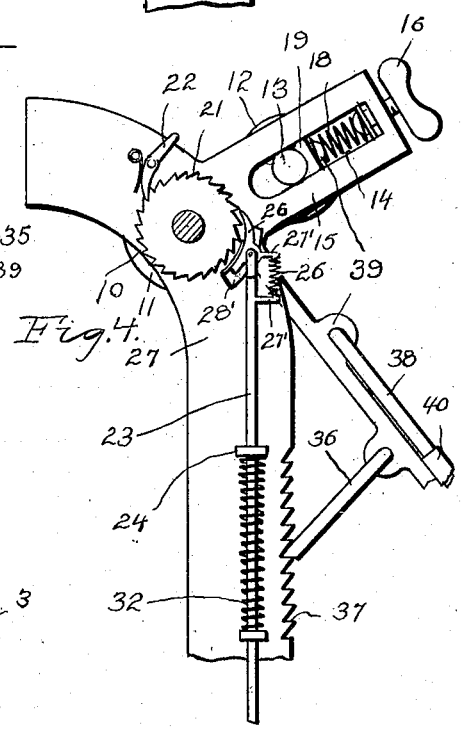
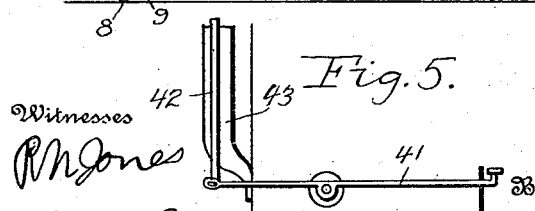
Inventor
H. E. Hendrix.
Witnesses

UNITED STATES PATENT OFFICE.

HIRAM E. HENDRIX, OF VICTORIA, BRITISH COLUMBIA, CANADA.

COPY-HOLDER FOR TYPE-WRITERS.

1,227,436. Specification of Letters Patent. Patented May 22, 1917.

Application filed February 25, 1914. Serial No. 820,922.

*To all whom it may concern:*

Be it known that I, HIRAM E. HENDRIX, a citizen of the United States, residing at Victoria, British Columbia, Canada, have invented certain new and useful Improvements in Copy-Holders for Type-Writers; and I do hereby declare the following to be a full, clear, and exact description of the invention, such as will enable others skilled in the art to which it appertains to make and use the same.

The primary object of this invention is to provide a copy holder for attachment to typewriting machines, which may be easily operated by the typist, which will hold the copy squarely in front of the operator, and which will mark the line being copied.

Another and more specific object of the invention is to provide a copy holder of this nature having a supporting plate for the paper, which may be angularly adjusted about a horizontal axis so that the operator of the typewriter may get the best light possible upon his work.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description, and accompanying drawings, in which—

Figure 1 is a side elevation of my holder, showing the same secured to a typewriter, Fig. 2 is a front elevation of the copy holder, Fig. 3 is a transverse section taken on the plane of line 3—3 of Fig. 2, Fig. 4 is a section taken on the plane of line 4—4 of Fig. 2, and Fig. 5 is a detail view in elevation illustrating a slightly modified form of my invention.

Referring in detail to the drawings by numerals, 1 designates as an entirety, a substantially rectangular frame having a bottom bar 2, side bars or standards 3, which are extended rearwardly adjacent their upper ends, as indicated by the numeral 3′, and a top bar 4. On the lower ends of each of the arms 3 there is formed a horizontal attaching arm 4′ which is secured to a typewriter 5 by means of wing nuts 6 or other suitable fasteners. The bar 2 is provided with a pair of feet consisting of threaded stems 7 enlarged at their lower ends, as indicated by the numeral 8. These stems are threaded through openings formed in the bar and carry lock nuts 9 to engage the lower face of the bar.

A horizontal shaft 10 is journaled through the arms 3 adjacent their upper terminals and carries a feed roller 11 which coöperates with a second feed roller 12 mounted loosely on a shaft 13. The shaft 13 extends through longitudinal slots 14 formed in extension arms 15 connected to the forward edges of the standards 3. These arms extend forwardly and upwardly and have their end portions connected by a cross bar 16′. A screw 16 is threaded through the end of each of the arms 15 into the slots 14 and is engaged at its inner end by a flanged cap 17. An expansive spiral spring 18 bears at its outer end against this cap, and at its inner end against a block 19 slidable within the slots 14 to engage the shaft 13 to hold the roller 12 in engagement with the feed roller 11. By adjusting the screw 16, any desired pressure may be secured between the rollers.

To operate the roller 11, I secure to one end of the shaft 10, a ratchet disk 21 which is locked against rotation in one direction by a pawl 22. A vertical rod 23 is connected to the outer face of the lefthand arm 3 for longitudinal movement through bearings 24 and 25. The upper terminal of the rod 23 is bifurcated to receive the pawl 26, as clearly shown, and this pawl is held in engagement with the ratchet wheel of disk 21 by an expansive helical spring 26′ interposed between the arms 27′, one of said arms being formed on the pawl and the other arm on the rod 23, as shown. A flanged bearing plate 28′ is provided to properly guide the pawl in its movement to and from engagement with the disk 21.

To raise the rod 23 and operate the roller 11, I provide a plurality of levers 27, 28 and 29. The lever 27 is pivoted to the left hand supporting arm 4, as indicated by the numeral 30, and has its rear end secured to the lower terminal of the rod 23 by a pin and slot connection 31. The levers 28 and 29 are pivotally connected intermediate their ends to the side of the typewriter, as clearly shown in Fig. 1, so that when the outer end of the lever 29 is forced downwardly, the rod 23 will be moved upwardly. An expansive helical spring 32 is coiled about the rod 23 between the bearing 24 and is rigidly connected at its lower end to said rod, so that the rod will be positively returned to its lowermost position when pressure on the lever 29 is released.

The copy is supported on a plate 33 mounted in a U-shaped frame 34, the arms of which extend beyond the inner edge of the plate, as indicated by the numeral 35, and are then extended outwardly into connection with the standards 3. The frame 34 may be swung about the fixed ends of its arms as pivots and may be held in different adjusted positions by means of a strut 36 which is connected to one of the frame arms and which engages teeth 37 formed in the forward edge of the lefthand arm 3.

A marker frame 38 of U-shape formation is connected to the frame 34 by having its terminals extended outwardly through ears 39. A marking strip 40, preferably made of red celluloid, is connected to the arms of the marker frame by having its terminals bent therearound, and this means of connection allows the marker to be slid toward and away from the central portion of the marker frame.

Having explained the construction of the preferred form of my invention, I will now state briefly the operation thereof; a sheet of copy, 40', such as a letter, is passed under the marker and between the feed rollers 11 and 12. The marker is then adjusted to the proper position for the first line of writing, and the frame 34 is swung into the position where the best light is obtained. Now when it is desired to feed the copy so as to bring the successive lines above the marker 40, it is only necessary to press downwardly on the outer end of the lever 29.

In the modified form of my invention, illustrated in Fig. 5, only one operating lever 41 is necessary. As will be seen this lever is pivoted intermediate its ends to the side of the typewriter and connects directly with the operating rod for the feed mechanism, said rod being designated by the numeral 42. The main frame 43 is connected directly to the typewriting machine by any suitable means and it will be seen that it is unnecessary to use connecting arms 4, such as illustrated in Fig. 1.

From the foregoing description taken in connection with the accompanying drawings, it will be seen that I have provided a very simple and practical copy holder which will save the operator much time and trouble and allow more efficient work to be done.

While I have shown and described the preferred embodiment of my invention, it will be understood that minor changes in construction, combination and arrangement of parts may be made without departing from the spirit and scope of the invention as claimed.

Having thus described my invention, I claim:—

In a copy holder, a frame including a pair of vertical spaced standards, a roller journaled between said standards, adjacent the upper end thereof, a spring actuated roller coacting with the first mentioned roller, a ratchet wheel secured on said shaft, a pair of spaced guides secured to one of said standards, a rod vertically movable in said guides, and extending from the lower portion of said standards to said ratchet wheel, the upper end of said rod being bifurcated and positioned adjacent said ratchet wheel, a pawl pivoted in said bifurcated portion of said rod and engaging said ratchet wheel, a lug formed on said rod adjacent the upper end thereof, a spring bearing against said lug and said pawl to normally hold said pawl in engagement with said ratchet wheel, a spring around said rod and positioned between said guides, and having the lower end thereof secured to said rod and the opposite ends of said upper guide to normally hold said rod downward, and means to move said rod upward against the tension of the spring for the purpose specified.

In testimony whereof I affix my signature in presence of two witnesses.

HIRAM E. HENDRIX.

Witnesses:
FLORENCE EMILY NEWSON,
EDWARD PARSONS.

Copies of this patent may be obtained for five cents each, by addressing the "Commissioner of Patents, Washington, D. C."